(No Model.)
J. P. BALL.
NUT LOCK.
No. 306,377. Patented Oct. 14, 1884.
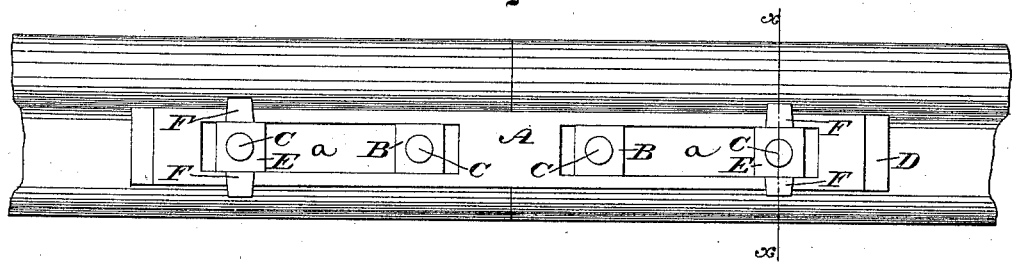
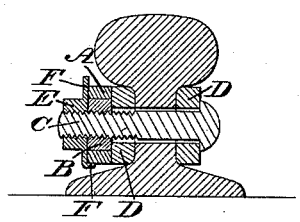
WITNESSES:
L. Douville
W. F. Kircher
INVENTOR:
James P. Ball,
BY John A. Wiedersheim,
ATTORNEY.

UNITED STATES PATENT OFFICE.

JAMES P. BALL, OF PHILADELPHIA, PENNSYLVANIA, ASSIGNOR OF TWO-THIRDS TO NATHANIEL M. BENNETT AND MARY EMILY BATES, BOTH OF SAME PLACE.

NUT-LOCK.

SPECIFICATION forming part of Letters Patent No. 306,377, dated October 14, 1884.

Application filed September 14, 1883. (No model.)

*To all whom it may concern:*

Be it known that I, JAMES P. BALL, a citizen of the United States, residing in the city and county of Philadelphia, State of Pennsylvania, have invented a new and useful Improvement in Nut Locks or Fastenings, which improvement is fully set forth in the following specification and accompanying drawings, in which—

Figure 1 is a side elevation of a nut lock or fastening embodying my invention. Fig. 2 is a vertical section thereof in line $xx$, Fig. 1.

Similar letters of reference indicate corresponding parts in the two figures.

My invention consists of a slotted bar adapted to embrace a nut, and a nut having wings integral therewith adapted to be bent around said bar, whereby the bar is prevented from displacement and both nuts from rotation, the construction of parts being hereinafter fully set forth and definitely claimed.

Referring to the drawings, A represents a bar longitudinally slotted, as at $a\ a$, so as to embrace the nuts B to be fastened, said nuts in the present case being screwed on the bolts C, employed with the fish-plate D of railroad-rails.

E represents nuts which are formed with wings F and screwed on the bolts C, each nut and its wings being integral and rotating together as one, and preferably formed of malleable iron, the wings being of length greater than the height of the slot of the bar A, so as to project beyond the upper and lower walls of the bar A. When the nuts B are tightened, the bar A is fitted thereon, thus preventing rotation of said nuts. The nuts E are then screwed on the bolts against the bar to the required extent, and the wings F hammered or pinched so as to be bent over the top or bottom edge or both edges of the bar and interlock therewith, whereby the nuts E are prevented from rotation and the bar A from displacement, the nuts B thus being reliably fastened. By straightening out the wings the nuts E may be unscrewed and the bar A removed, whereby the nuts B are accessible and free to be removed.

Having thus described my invention, what I claim as new, and desire to secure by Letters Patent, is—

A nut-fastening consisting of the bar A, having longitudinally-extending slots $a\ a$, the bolts C, the nuts B, fitted on said bolts and embraced by the walls of said slots, and nuts E, fitted on said bolts and formed with radial wings integral therewith bent inwardly over said bar, substantially as and for the purpose set forth.

JAMES P. BALL.

Witnesses:
JOHN A. WIEDERSHEIM,
CLARENCE B. WENGER.